United States Patent [19]

Cueto

[11] 4,134,715
[45] Jan. 16, 1979

[54] HEAD FOR MULTIPLE INSULATION OF CONDUCTORS

[75] Inventor: Agustin Cueto, Zaragoza, Spain

[73] Assignee: Cables de Communicaciones, S.A. of Poligono Industrial de Maplica C/D, Zaragoza, Spain

[21] Appl. No.: 754,415

[22] Filed: Dec. 27, 1976

[30] Foreign Application Priority Data

Jul. 26, 1976 [ES] Spain .................................... 222.540

[51] Int. Cl.² ............................................... B29F 3/08
[52] U.S. Cl. ..................................... 425/144; 269/287; 425/114; 425/192 R; 425/376 A; 425/464
[58] Field of Search ............... 425/382, 464, 113, 114, 425/190, 192, 191, 472, 376 R, 144, 461, 376 A; 269/254 R, 287, 240; 264/176 R

[56] References Cited
U.S. PATENT DOCUMENTS 2,814,070  11/1957  Bulkley et al. ................... 425/190 X
3,193,878  7/1965  Corbett ................................ 425/382
3,263,271  8/1966  Hannis ........................... 425/464 X
3,436,952  4/1969  Hájikano ......................... 425/191 X
3,551,951  1/1971  Schiesser ........................ 425/191 X
3,599,286  8/1971  Karet .................................. 425/464
3,867,082  2/1975  Lambertus ...................... 425/464 X Primary Examiner—Francis S. Husar
Assistant Examiner—Mark Rosenbaum
Attorney, Agent, or Firm—Eyre, Mann, Lucas & Just

[57] ABSTRACT

A unitary head, adapted to attachment to the outlet of an extruder contains a main inlet duct for passing hot extruded plastic material to a flow regulator which divides and controls the flow of the plastic material into a plurality of calibrated passages. The calibrated passages terminate at jaws which are adapted to grip and hold dies. The plastic material passes from the calibrated passages into the dies and coats the cable passing therethrough. An electric heater on the housing controlled by a thermostat in thermal contact with the housing maintains the housing at working temperature.

1 Claim, 1 Drawing Figure

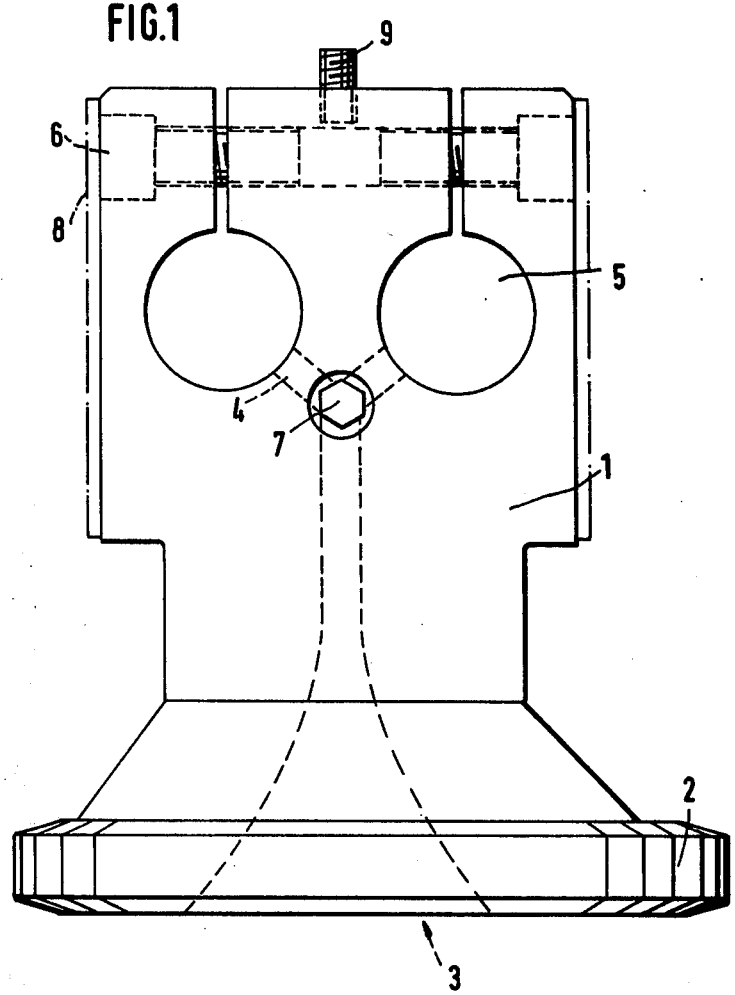

HEAD FOR MULTIPLE INSULATION OF CONDUCTORS

The insulating layer around the conducting core in cables must have perfect concentricity with the conductor, and also a uniform and constant thickness, in order for it to perform its purpose satisfactorily.

The present invention is intended to provide a solution enabling conductor cables to have these features as regards the insulation, but where such cables can be insulated in a simplified and very much more advantageous way, and for this purpose it proposes a feeder head with which several conductors can be covered at once, to provide them with a homogeneous insulating layer with an even thickness throughout its length.

Essentially this head which is the object of the invention is comprised of a block or body which houses several self-centering dies, where moreover such dies can be used regardless of the purpose they were made for, and only require to be adjusted for size.

With this head, the insulating material, upon being injected by the extruder, goes into it in the normal way, but once inside, it is distributed to the different dies by means of calibrated passages, through which the rate of flow can be regulated.

In this way, a distribution is achieved allowing the homogeneous flow of the insulating material, since it is possible to feed the different dies in the head in a uniform and balanced manner, regardless of the volume of flow and the thickness of the insulation to be applied.

Moreover, this head adapts itself perfectly well to the highest speeds which, with present technology in this industry, can be used when insulating conductors, thus allowing for a very high rate of production; while at the same time, due to the multiple distribution system, it increases the efficiency of the extruder, since it reduces the back-pressure at the outlet from the dies.

In order to provide a better understanding of the nature of the invention, a drawing is attached showing a schematic illustration of its use, but this illustration is in no way to be construed as imposing any limits, and it may therefore be subjected to those minor alterations which do not depart from the essential features.

FIG. 1 shows a view of the head in question, where its different particulars can be seen.

The head being dealt with here comprises a part (1) made from special steel suitably heat treated and machined, which at one end has a shape (2) for the purpose of attaching it to the extruder to which it is to be applied.

At this coupling end (2), there is an inlet duct (3), which once inside part (1), branches out into a number of calibrated passages (4), leading towards the respective housings (5) for the self-centering dies, of the conventional type.

These housings (5) for the dies are made to have jaws, so that the respective dies are gripped in them when they are closed by means of screws (6).

At the convergence of calibrated passages (4) with the inlet duct (3), there is a regulator (7) so that the flow of material coming from the inlet duct (3) and going along calibrated passages (4) towards the housings (5) for the dies, can be controlled with this regulator.

The proper working temperature in the head is maintained by means of heater element (8), whose operation is controlled by means of a thermostat (9).

The illustration of the head as depicted on the drawing in accordance with the features described, shows it as it would be for covering two conductors simultaneously, but it will be readily understood that this is not the only possibility, because in this same manner, the head can be adapted to deal with a greater number of conductors, it only being necessary to provide it with the required number of housings (5) and passages (4).

I claim:

1. A head for multiple insulation of conductors, comprising a one-piece body, a shape on one end of said body adapted to enable it to be coupled to an extrusion machine, at least two sets of jaws in said body, said jaws forming circular openings passing completely through said body in a substantially straight path, said jaws being adapted to grip self-centering dies, a main inlet duct through said shape, a plurality of calibrated passages connected to said main inlet duct, at least one flow regulator means operatively associated with said calibrated passages for regulating the flow of material passing from the main inlet duct to the plurality of calibrated passages, said calibrated passages opening into said jaws substantially normal to the axes of said circular openings, heating means on said body for keeping it at the right working temperature, and thermostat means in thermal contact with said body for controlling said heating means.

* * * * *